United States Patent
Smith

(10) Patent No.: US 7,457,886 B1
(45) Date of Patent: Nov. 25, 2008

(54) SYSTEM AND METHOD FOR INPUT/OUTPUT SCHEDULING

(75) Inventor: Michael J. Smith, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 10/867,622

(22) Filed: Jun. 15, 2004

Related U.S. Application Data

(63) Continuation of application No. 10/770,856, filed on Feb. 3, 2004, now abandoned.

(51) Int. Cl.
*G06F 3/00* (2006.01)

(52) U.S. Cl. .............................. 710/6; 710/15; 710/100; 710/107; 710/111; 712/1; 712/32; 712/42; 712/43

(58) Field of Classification Search .................... 710/1, 710/6, 15, 100, 107, 111; 712/1, 32, 42, 712/43
See application file for complete search history.

(56) References Cited

U.S. PATENT DOCUMENTS

| | | | | |
|---|---|---|---|---|
| 5,394,547 A | * | 2/1995 | Correnti et al. | ............. 717/175 |
| 6,160,812 A | * | 12/2000 | Bauman et al. | ............. 370/416 |
| 6,904,470 B1 | * | 6/2005 | Ofer et al. | ...................... 710/6 |
| 2005/0144332 A1 | * | 6/2005 | Nellitheertha | ................ 710/15 |

\* cited by examiner

*Primary Examiner*—Niketa I. Patel
*Assistant Examiner*—Jasjit S Vidwan
(74) *Attorney, Agent, or Firm*—Schwegman, Lundberg & Woessner, P.A.

(57) ABSTRACT

A system and method for Input/Output scheduling are described herein. In one embodiment, the method includes installing a plurality of Input/Output (I/O) schedulers to schedule I/O requests for a plurality of I/O devices, wherein each of the I/O schedulers schedules I/O requests according to a different scheduling method. The method also includes scheduling one of the I/O requests with at least one of the plurality of I/O schedulers. The method also includes determining that a second I/O scheduler replaces an I/O scheduler of the plurality of I/O schedulers, installing the second I/O scheduler, and scheduling one of the I/O requests with the second scheduler.

22 Claims, 11 Drawing Sheets

SYSTEM AND METHOD FOR INPUT/OUTPUT SCHEDULING

CROSS-REFERENCE TO RELATED APPLICATION

This application is a continuation of U.S. patent application Ser. No. 10/770,856, filed Feb. 3, 2004, now abandoned which application is incorporated herein by reference.

FIELD

This invention relates generally to the field of computer operating systems and more particularly Input/Output scheduling.

BACKGROUND

Operating systems typically schedule Input/Output (I/O) requests based on scheduling algorithms, which are carried out by I/O schedulers. According to one prior-art I/O scheduling technique, a single I/O scheduler schedules all I/O requests occurring within an operating system environment. For example, a single I/O scheduler schedules disk requests, printer requests, etc. One disadvantage of such an I/O scheduling technique is that a single scheduler is not typically suited for all I/O devices. For example, using a FIFO scheduler for scheduling both printer requests and disk requests may provide mixed results. That is, the FIFO scheduler may perform well for the printer requests, as printer requests are often expected to be scheduled on a first-come first-served basis. However, FIFO may not perform well vis-à-vis the disk requests, as disk requests can typically be scheduled with shorter turn-around times when the I/O scheduling algorithm considers the physical and logical properties of the disk. Thus, a single scheduler may not provide good performance for multiple I/O devices.

Another prior art technique calls for configuring multiple I/O schedulers when an operating system is compiled. Typically, before an operating system can be executed on a computer, the operating system source code must be compiled into executable machine code. During this compilation process, the operating system is configured to employ certain I/O schedulers for scheduling I/O on the target computer. For example, at compile time, an operating system is configured to use a FIFO scheduler for printer requests and a SCAN scheduler for disk requests. One disadvantage of this prior art technique is that every time the I/O scheduler is reconfigured, certain operating system components must be recompiled. Moreover, the I/O schedulers cannot be reconfigured to respond to changing I/O demands while the operating system is executing. For example, the operating system could not shift from a SCAN scheduler to an Earliest Deadline First scheduler in response to launching an application that requires real-time disk-scheduling.

SUMMARY

According to embodiments of the invention, an Input/Output (I/O) scheduling system includes an operating system, which is adapted to install a set of I/O schedulers at boot-up. After boot-up, during typical operation, the operating system receives I/O scheduler requests from application and/or control programs. In response to the I/O scheduler requests, the operating system can dynamically replace (i.e. replace without rebooting) installed I/O schedulers with requested I/O schedulers.

BRIEF DESCRIPTION OF THE FIGURES

The present invention is illustrated by way of example and not limitation in the Figures of the accompanying drawings in which.

DESCRIPTION OF THE EMBODIMENTS

Figure 1:
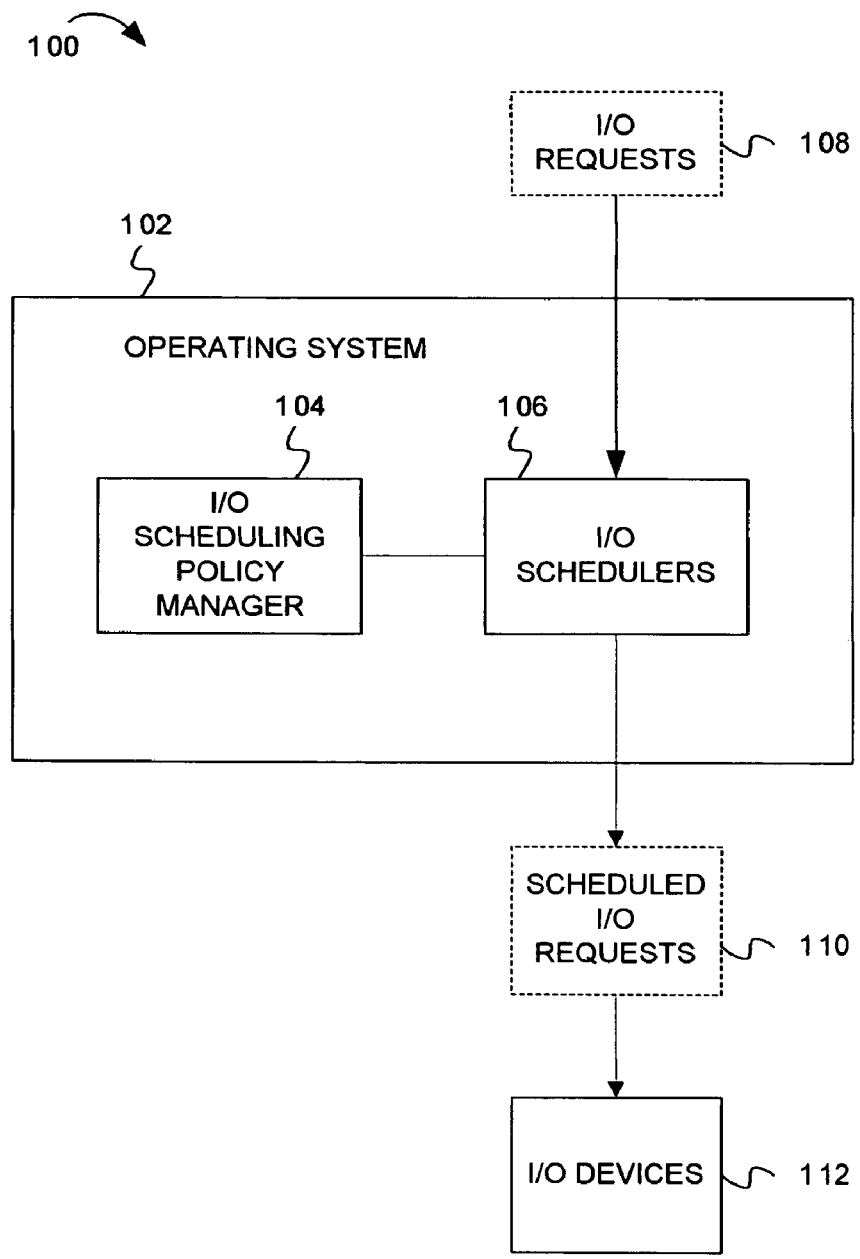
FIG. 1 is a dataflow diagram illustrating a flow of Input/Output (I/O) requests scheduled in an operating system, according to example embodiments of the invention.

A system and method for Input/Output scheduling are described herein. In the following description, numerous specific details are set forth. The following description and the drawing figures illustrate aspects and embodiments of the invention sufficiently to enable those skilled in the art. Other embodiments may incorporate structural, logical, electrical, process, and other changes; e.g., functions described as software may be performed in hardware and vice versa. Examples merely typify possible variations, and are not limiting. Individual components and functions are optional unless explicitly required, and the sequence of operations may vary or run in parallel. Portions and features of some embodiments may be included in, substituted for, and/or added to those of others. The scope of the invention encompasses the full ambit of the claims and all available equivalents.

This description of the embodiments is divided into four sections. In the first section, a system-level overview is presented. In the second section, methods for using example embodiments are described. In the third section, an example implementation is described. In the fourth section, a hardware and operating environment is described.

System-Level Overview

This section provides a system level overview of example embodiments of the invention.

FIG. 1 is a dataflow diagram illustrating a flow of Input/Output (I/O) requests scheduled in an operating system, according to example embodiments of the invention. The I/O system 100 includes an operating system 102, which includes an I/O scheduling policy manager 104 and I/O schedulers 106. The operating system is communicatively coupled to I/O devices 112. During operating system boot-up, the I/O scheduling policy manager 104 selects and installs certain of the I/O schedulers 106 to schedule I/O requests 108 received by the operating system 102. After operating system boot-up, the installed I/O schedulers receive and schedule the I/O requests 108 for service by the I/O devices 112. The installed I/O schedulers transmit the scheduled I/O requests 110 to the I/O devices 112 for processing. Each of the installed I/O schedulers schedules I/O requests according to a scheduling algorithm, such as FIFO, SCAN (disk requests), earliest deadline first, etc. During typical operations, the operating system can dynamically replace any of the installed I/O schedulers without rebooting.

One advantage of certain embodiments is that the I/O scheduling policy manager 104 can, in response to changing I/O demands, dynamically replace any installed I/O scheduler with another of the I/O schedulers 106. As a result, the operating system 102 can tailor its I/O scheduling capabilities to accommodate a vast range of operating conditions. For example, when a real-time application is launched, the real-time application can request that the I/O scheduling policy manager 104 install a real-time I/O scheduler. In response to this request, the I/O scheduling policy manager 104 installs a real-time I/O scheduler (e.g., an earliest deadline first I/O scheduler) to meet the real-time application's I/O scheduling needs. When the real-time application terminates, the I/O scheduling policy manager 104 can replace the real-time scheduler with a non-real-time scheduler.

As another example, the I/O scheduling policy manager 104 can install different I/O schedulers based on I/O performance statistics collected by the operating system 102.

For example, if the operating system 102 indicates that print request turn-around times are extremely slow for an installed FIFO I/O scheduler, the I/O scheduling policy manager 104 can dynamically replace the FIFO I/O scheduler with a round robin I/O scheduler.

Methods of the Invention

This section describes methods performed by embodiments of the invention. In certain embodiments, the methods are performed by machine-readable media (e.g., software), while in other embodiments, the methods are performed by hardware or other logic (e.g., digital logic). In this section, FIGS. 3-5 will be discussed. In particular, FIG. 3 describes operations performed by an operating system for dynamically replacing an I/O scheduler, while FIG. 4 describes operations performed by an application program for requesting a particular I/O scheduler to accommodate its I/O scheduling needs. FIG. 5 describes operations for installing a newly selected I/O scheduler.

Figure 2:
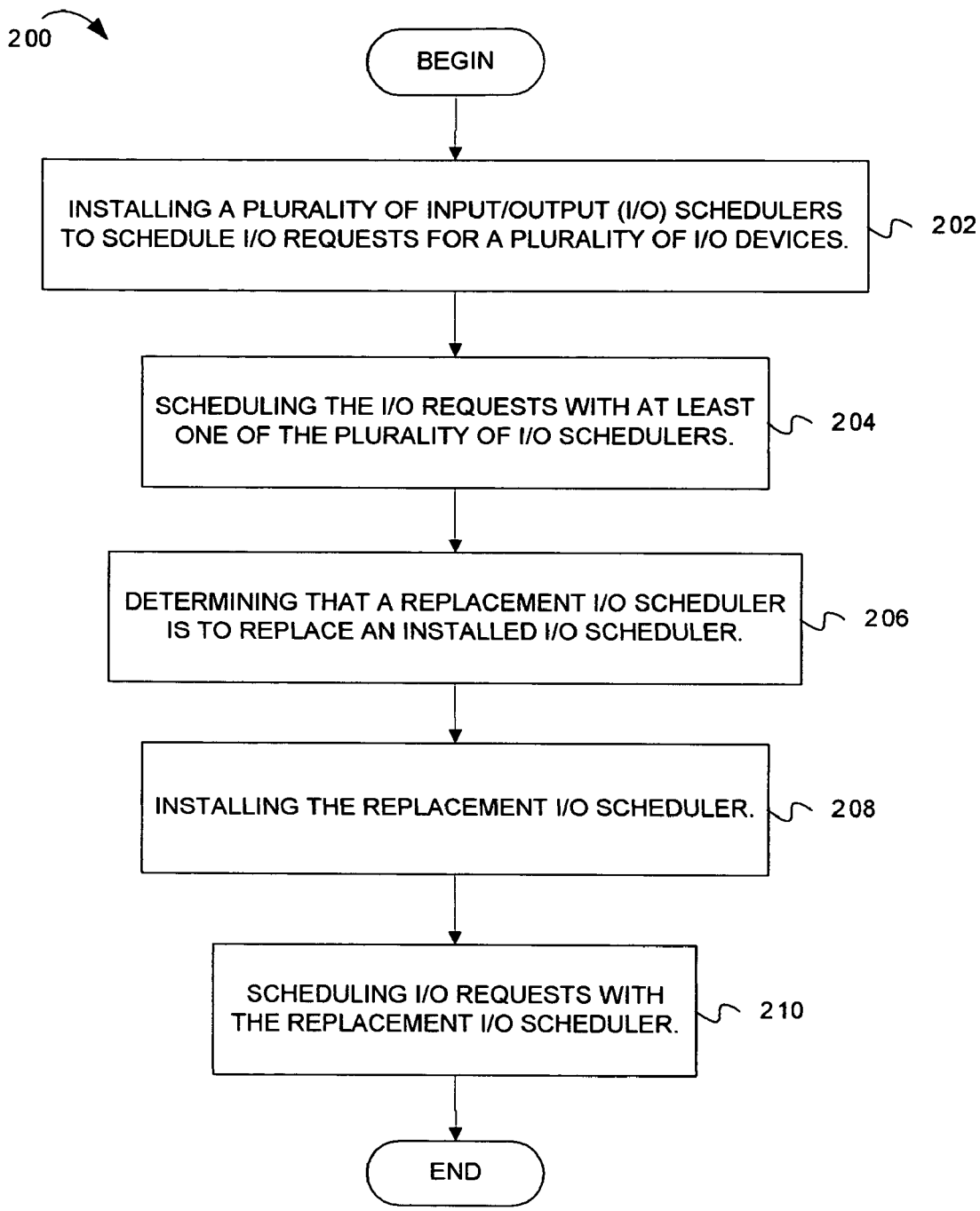
FIG. 2 is a flow diagram illustrating a method for installing and replacing Input/Output schedulers, according to example embodiments of the invention.

FIG. 2 is a flow diagram illustrating a method for installing and replacing Input/Output schedulers, according to example embodiments of the invention. According to embodiments of the invention, the I/O scheduling policy manager 104 is capable of changing I/O schedulers while operating system 102 is operational. The flow diagram 200 commences at block 202, wherein a plurality of I/O schedulers is installed to schedule I/O requests for a plurality of I/O devices. At block 204, I/O requests are scheduled by at least one of the plurality of I/O schedulers. At block 206, it is determined that a replacement I/O scheduler is to replace one of the installed I/O schedulers. At block 208, the replacement I/O scheduler is installed. At block 210, I/O requests are scheduled with the replacement I/O scheduler. From block 210, the flow ends.

Figure 3:
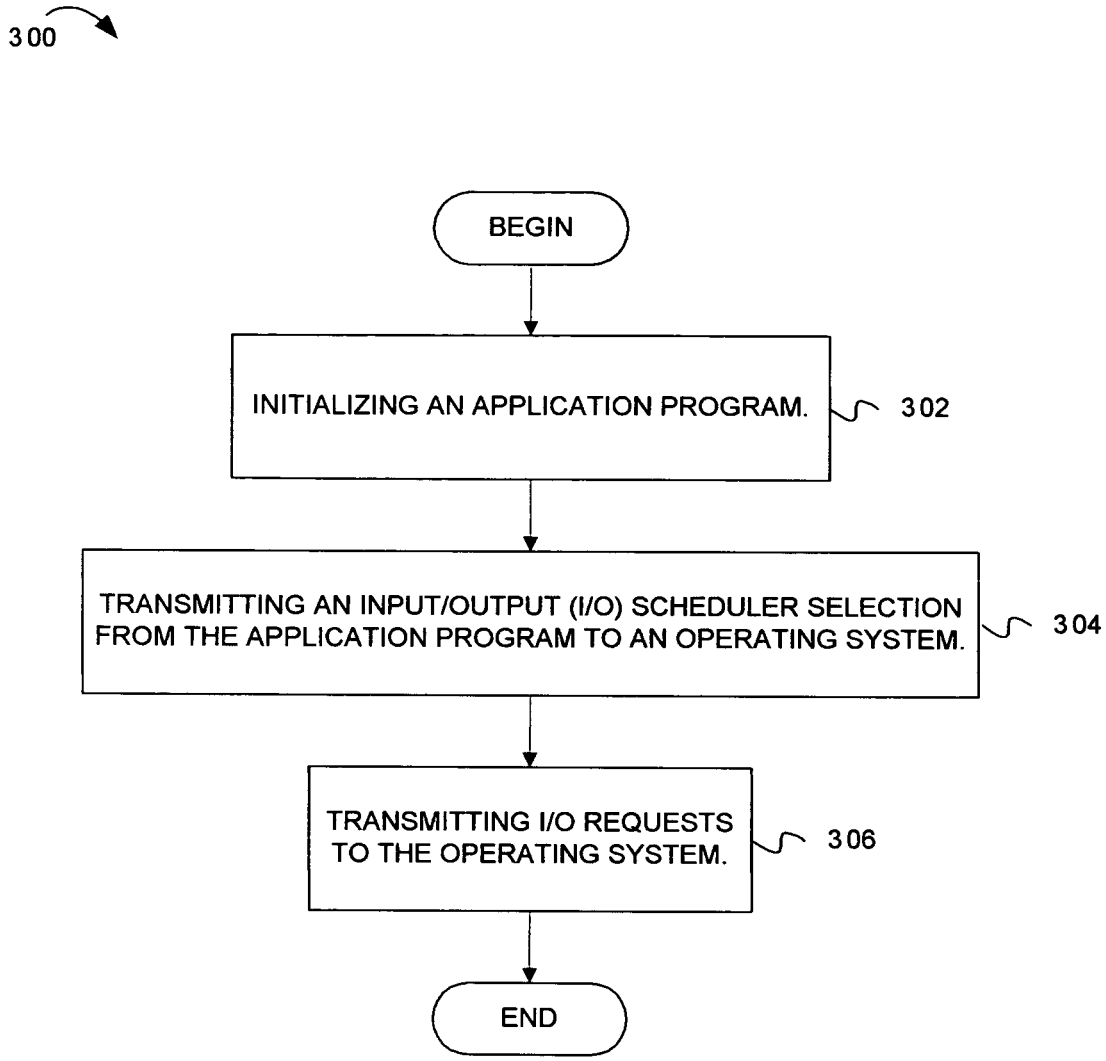
FIG. 3 is a flow diagram illustrating operations for an application program selecting an Input/Output scheduler, according to example embodiments of the invention.

FIG. 3 is a flow diagram illustrating operations for an application program selecting an Input/Output scheduler, according to example embodiments of the invention. In one embodiment, an application program can request that the I/O scheduling policy manager 104 install a particular I/O scheduler to accommodate the application program's particular I/O needs. The flow diagram 300 begins at block 302.

At block 302, an application program is initialized (e.g., the application program is launched by a user). At block 304, the application program transmits an I/O scheduler selection to an operating system. At block 306, the application program transmits I/O requests to the operating system.

Figure 4:
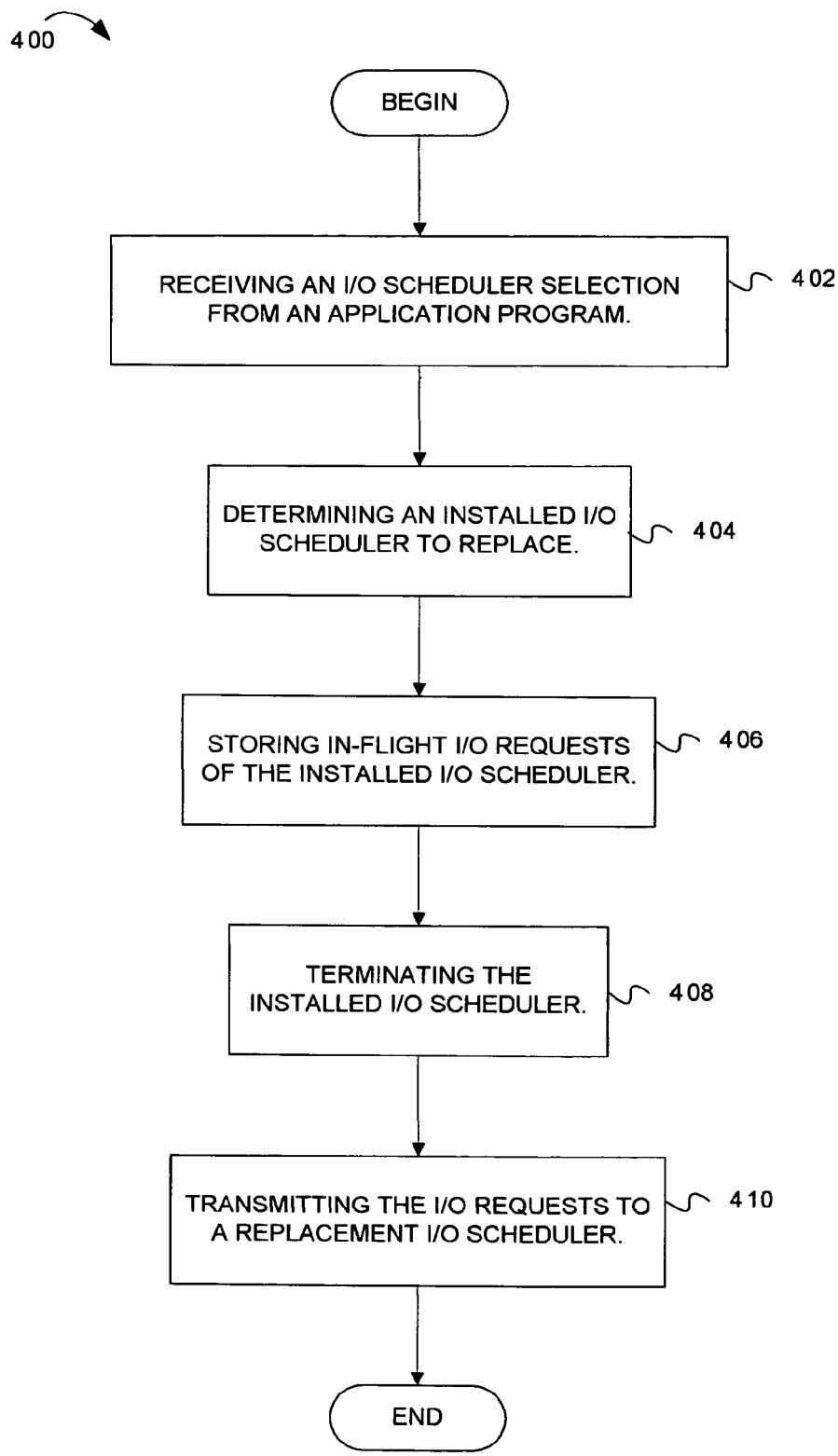
FIG. 4 is a flow diagram illustrating operations for receiving an I/O scheduler selection from an application program and installing the selected I/O scheduler in an I/O scheduling system.
Figure 5:
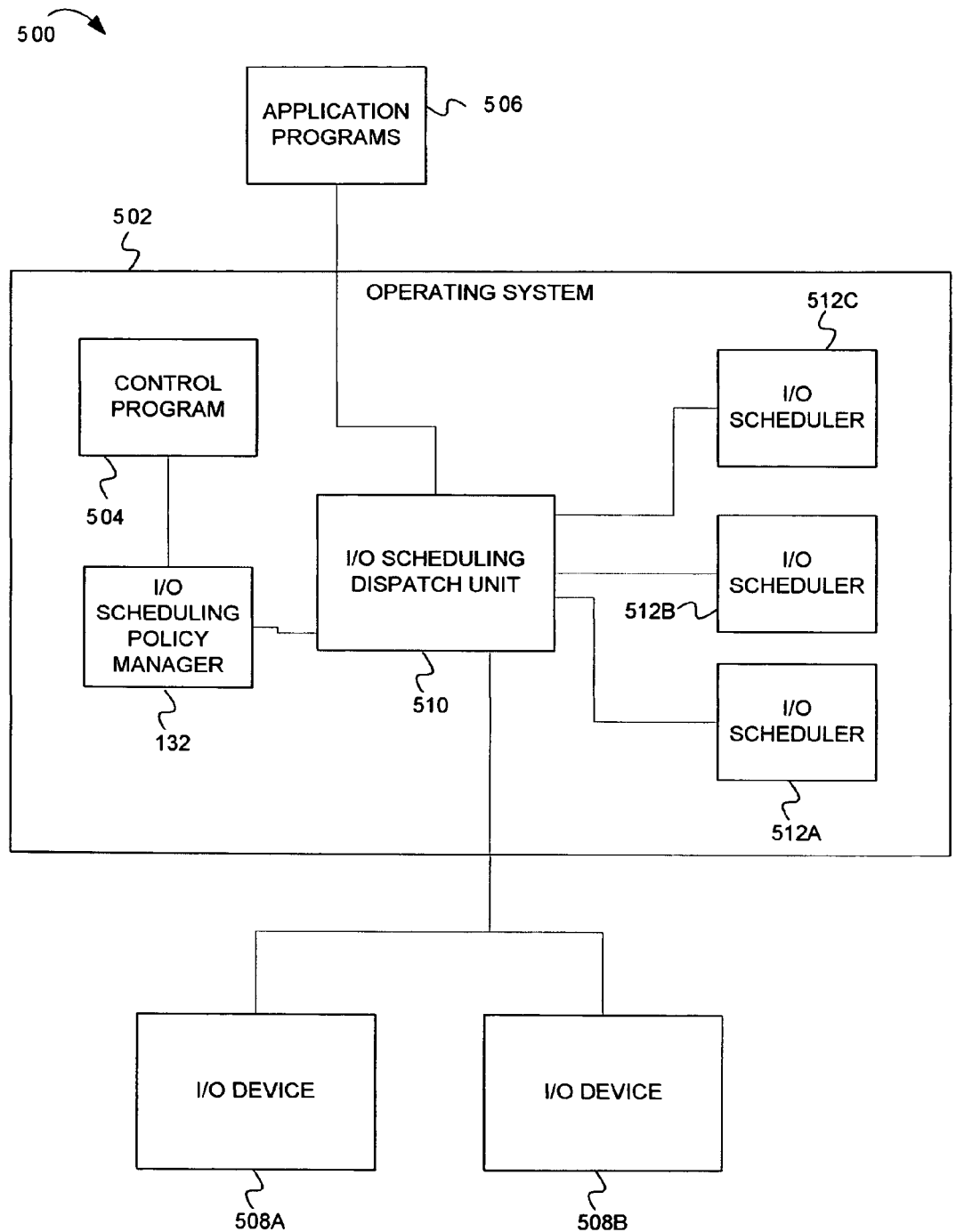
FIG. 5 is a block diagram illustrating a system architecture for scheduling I/O requests, according to example embodiments of the invention.

While FIG. 3 describes operations for selecting an I/O scheduler, FIG. 4 describes operations for installing the newly selected I/O scheduler.

FIG. 4 is a flow diagram illustrating operations for receiving an I/O scheduler selection from an application program and installing the selected I/O scheduler in an I/O scheduling system. In one embodiment, the selected I/O scheduler is installed in the I/O scheduling system while the I/O system contemporaneously schedules I/O requests. At block 402, an I/O scheduler selection is received from an application program. The I/O scheduler selection indicates a replacement for an installed I/O scheduler. At block 404, it is determined that a particular installed I/O scheduler is to be replaced. At block 406, in-flight I/O requests of the installed I/O scheduler are stored. As shown block 408, the installed I/O scheduler is terminated. At block 410, I/O requests are transmitted to the replacement scheduler.

Example Implementation

This section describes an example implementation of an I/O system. In this section, FIGS. 5-10 will be presented. FIG. 5 describes an example system architecture, while FIGS. 6-10 describe the operations performed by each component of the system architecture.

Figure 6:
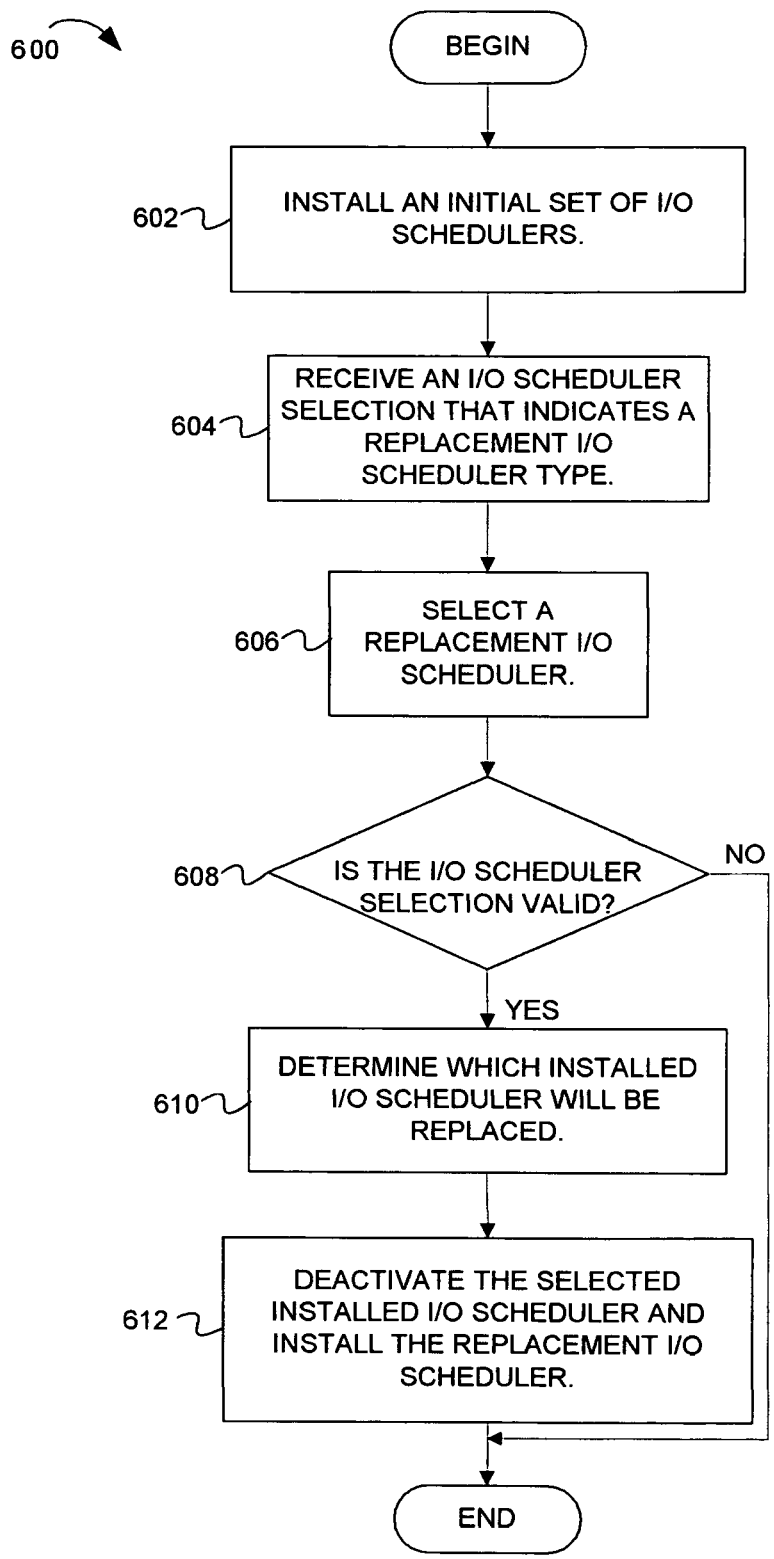
FIG. 6 is a flow diagram illustrating operations for installing a set of initial I/O schedulers and replacing an installed I/O scheduler with a selected replacement I/O scheduler, according to example embodiments of the invention.
Figure 7:
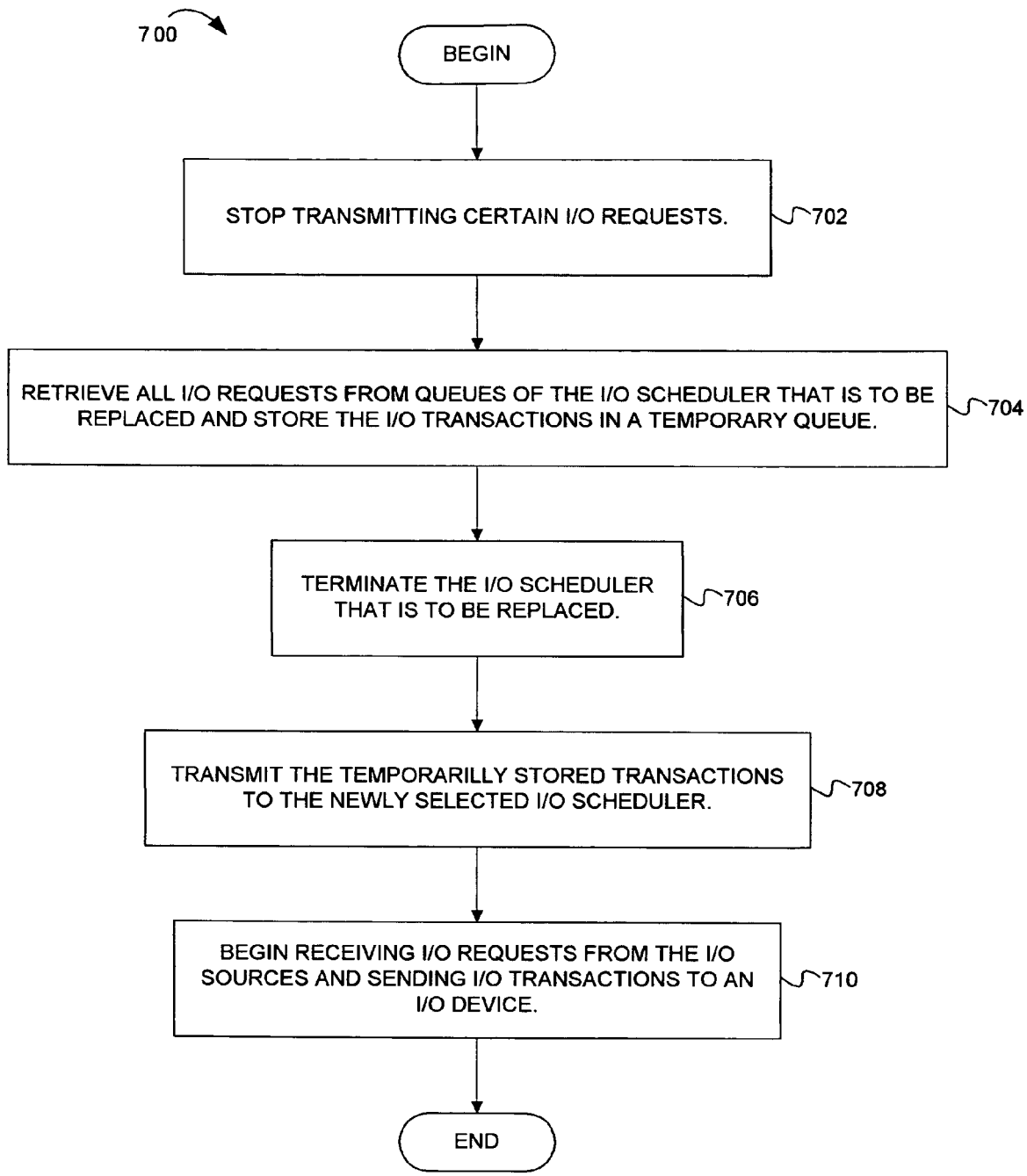
FIG. 7 is a flow diagram illustrating more detailed operations for installing a replacement I/O scheduler, according to example embodiments of the invention.
Figure 8:
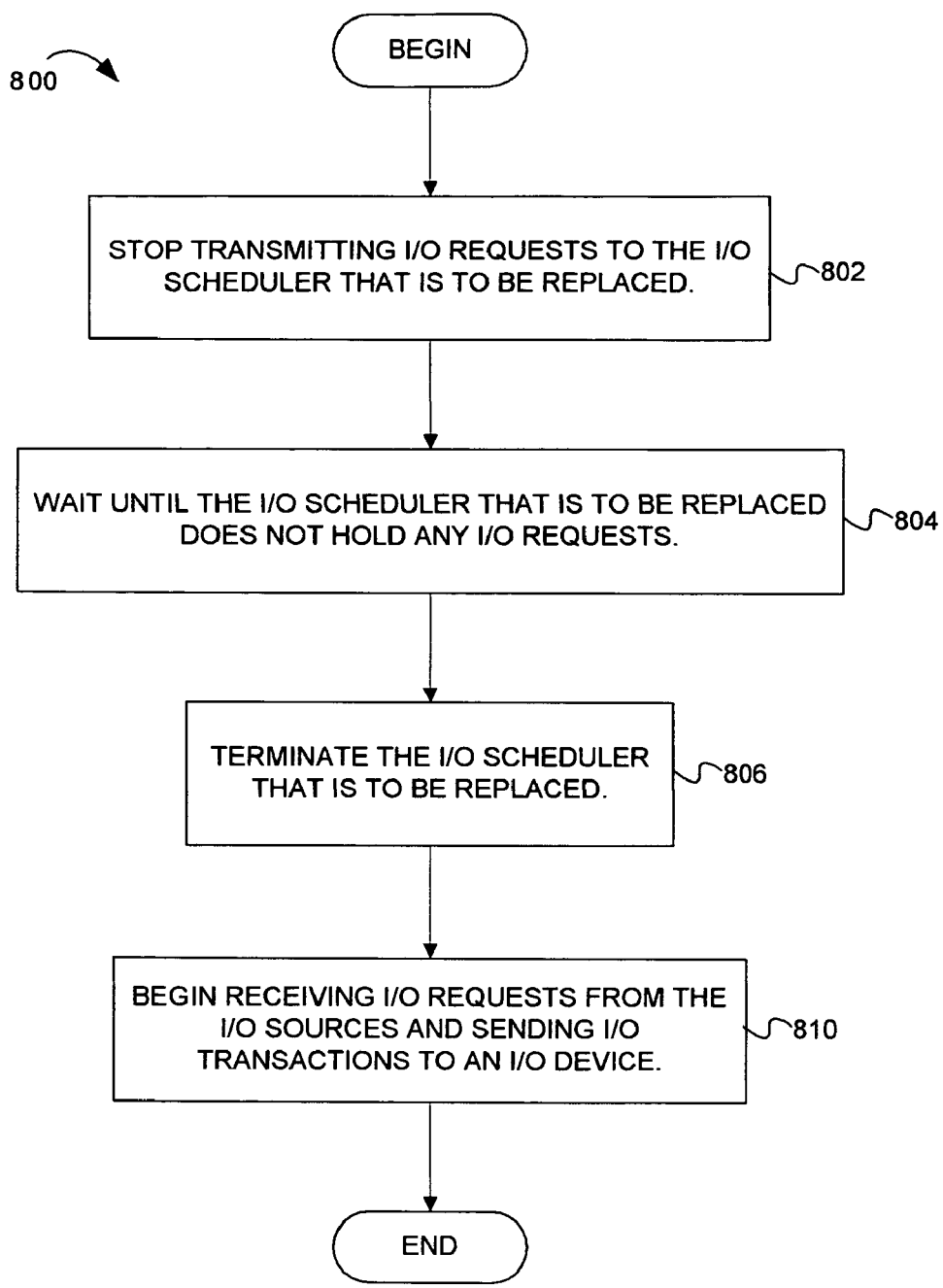
FIG. 8 is a flow diagram illustrating alternative operations for installing a replacement I/O scheduler, according to example embodiments of the invention.

In particular, FIG. 6 describes more detailed operations for installing a set of initial I/O schedulers and replacing one of those initial I/O schedulers. FIGS. 7-8 describe more detailed operations for installing an I/O scheduler, while FIG. 9 describes operations performed by an application program for requesting that the operating system install a particular I/O scheduler. FIG. 10 describes operations performed by a control program, which collects I/O statistics and requests a new I/O scheduler based on a statistical analysis.

FIG. 5 is a block diagram illustrating a system architecture for scheduling I/O requests, according to example embodiments of the invention. The I/O system 500 includes an operating system 502, which includes the components described below. The operating system 502 can be any suitable operating system, such as Windows (available from Microsoft, Inc.), Solaris (available from Sun Microsystems), HPUX (available from Hewlett Packard), Digital Unix/Tru64 (available from Compaq), and Dynix (available from Dynix), etc.

In FIG. 5, application programs 506 are connected to an I/O scheduling dispatch unit 510. The I/O scheduling dispatch unit 510 is connected to I/O schedulers 512A-512C. The I/O schedulers 512A-512C can include I/O schedulers that schedule I/O requests using a first-in first-out I/O scheduling method, a last-in first-out I/O scheduling method, variations of the SCAN disk-scheduling method, etc. The I/O schedulers 512A-512C can also include I/O schedulers that schedule I/O requests using real-time I/O scheduling methods such as earliest deadline first, least laxity, etc.

The I/O scheduling dispatch unit 510 is also connected to an I/O scheduling policy manager 532 and I/O devices 508A and 508B. The I/O devices 508A-B can include any suitable I/O device such as a disk drive, printer, video controller card, keyboard, memory unit, etc.

The I/O scheduling policy manager 532 is connected to a control program 504. The control program 504 can be software or hardware that monitors I/O performance and tracks I/O statistics. According to one embodiment, the control program 504 is part of the operating system 502, while in another embodiment, the control program 504 is not part of the operating system 502 (e.g., the control program communicates with the operating system through an application programming interface). In one embodiment, the control program 504 tracks the number of I/O requests processed by each of the I/O devices 508A-B, the turnaround time for processing I/O requests, the throughput of each of the I/O schedulers 512A-C, and other information relevant to optimizing the I/O system 500.

Any of the components used in conjunction with embodiments of the invention can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc. According to embodiments of the invention, the functional units can be other types of logic (e.g., digital logic) for executing the operations for I/O scheduling described herein.

While FIG. 5 describes an example system architecture, FIGS. 6-10 will described the functionality of each of the system components.

FIG. 6 is a flow diagram illustrating operations for installing a set of initial I/O schedulers and replacing an installed I/O scheduler with a selected replacement I/O scheduler, according to example embodiments of the invention. The flow diagram of FIG. 6 will be described with reference to the example I/O system of FIG. 5.

At block 602, the I/O scheduling policy manager 532 installs an initial set of I/O schedulers to schedule I/O requests for service by the I/O devices 508A-508B. More detailed operations for installing an I/O scheduler are described in greater detail below, with reference to FIGS. 7-8. The I/O scheduling policy manager 532 can install one I/O scheduler to schedule I/O requests for service by one I/O device. Alternatively, the I/O scheduling policy manager 532 can install an I/O scheduler to schedule I/O requests for service by multiple I/O devices. For example, the I/O scheduling policy manager 532 can install a FIFO I/O scheduler to schedule I/O requests for both a printer and a fax machine. In one embodiment, all of the installed I/O schedulers schedule I/O requests according to different scheduling algorithms. In an alternative embodiment, two or more of the installed I/O schedulers schedule I/O requests according to the same scheduling algorithm. In one embodiment, the I/O scheduling policy manager 532 does not install any install any initial I/O schedulers.

At block 604, the I/O scheduling policy manager 532 receives an I/O scheduler selection, which indicates a replacement I/O scheduler type (e.g., FIFO, SCAN, etc.). The I/O scheduler selection is received from the application program 506 or the control program 504.

At block 606, the I/O scheduling policy manager 532 selects a replacement I/O scheduler from the set of I/O schedulers 512A-512C. The replacement I/O scheduler is of the type indicated in the I/O scheduler selection.

As shown in block 608, the I/O scheduling policy manager 532 determines whether the I/O scheduler selection indicates an I/O scheduler type that is included within the operating system 502. For example, if the I/O scheduler selection indicates a FIFO I/O scheduler, and if one of the I/O schedulers 512A-512C is a FIFO I/O scheduler, the selection is valid. However, if the operating system 502 does not include a FIFO I/O scheduler, the I/O selection is not valid. If the I/O scheduler selection is valid, the flow continues at block 610. Otherwise, the flow ends.

At block 610, the I/O scheduling policy manager 532 determines which of the installed I/O schedulers will be replaced by the replacement I/O scheduler.

At block 612, the I/O scheduling policy manager 532 deactivates the selected installed I/O scheduler and installs the replacement I/O scheduler. As noted above, operations for installing an I/O scheduler are described in greater detail below, with reference to FIGS. 7-8.

While the discussion of FIG. 6 described general operations for initially installing and replacing I/O schedulers, the discussion of FIGS. 7-8 more detailed methods for installing a replacement I/O scheduler. In particular, FIGS. 7 and 8 describe the operation of block 612 in more detail.

FIG. 7 is a flow diagram illustrating more detailed operations for installing a replacement I/O scheduler, according to example embodiments of the invention. It should be understood that while one I/O scheduler is being replaced, the operating system 502 can schedule and service I/O requests with other I/O schedulers. The flow diagram 700 commences at block 702.

At block 702, the I/O scheduling policy manager 532 directs an I/O scheduler that is being replaced to stop transmitting I/O requests to an I/O device. The I/O scheduling policy manager 532 also directs the I/O scheduling dispatch unit, which receives, stores, and dispatches I/O requests, to stop transmitting I/O requests to an I/O scheduler that is being replaced.

At block 704, the I/O scheduling policy manager 532 retrieves any I/O requests stored in the I/O scheduler that is being replaced and stores them in a temporary storage unit. The temporary storage unit can be located within the I/O scheduling policy manager 532. However, the temporary storage location can be in any suitable location (e.g., in the I/O scheduling dispatch unit 510).

As shown in block 706, the I/O scheduling policy manager 532 terminates the I/O scheduler that is being replaced. The I/O scheduling policy manager 532 terminates the I/O scheduler by disassociating it from I/O device and I/O request sources (e.g., application programs 506). If the I/O scheduler is a software program, the I/O scheduling policy manager 532 may terminate the I/O scheduler by removing it from memory.

At block 708, the I/O scheduling policy manager 532 transmits the temporarily stored I/O requests to a replacement I/O scheduler.

At block 710, the I/O scheduling policy manager 532 directs the I/O scheduling dispatch unit 210 to begin transmitting I/O requests to the replacement I/O scheduler 212A.

The I/O scheduling dispatch unit 210 also directs the replacement I/O scheduler to begin transmitting I/O requests to one or more I/O device.

FIG. 8 is a flow diagram illustrating alternative operations for installing a replacement I/O scheduler, according to example embodiments of the invention. As noted above, the operating system 502 can schedule I/O requests with installed I/O schedulers at the same time a replacement I/O scheduler is being installed.

At block 802, the I/O scheduling policy manager 532 directs the I/O scheduling dispatch unit 510 to stop transmitting I/O requests an I/O scheduler that is to be replaced. The I/O scheduling dispatch unit 510 receives and stores I/O requests received during the I/O scheduler installation process.

At block 804, the I/O scheduling policy manager 532 waits until the I/O scheduler being replaced does not hold any I/O requests. That is, the I/O scheduling policy manager 532 waits until the I/O scheduler that is being replaced schedules all its in-flight I/O requests for service by an I/O device. In-flight I/O requests are I/O requests that are in the process of being scheduled for service. In other words, in-flight I/O requests are I/O requests that have been received by the operating system 502, but which have not been scheduled for service by an I/O device.

At block 806, the I/O scheduling policy manager 532 terminates the I/O scheduler that is being replaced. The I/O scheduling policy manager 532 terminates the I/O scheduler by disassociating it from I/O devices and I/O request sources.

At block 808, the I/O scheduling policy manager 532 directs the I/O scheduling dispatch unit 210 to begin transmitting I/O requests to the replacement I/O scheduler 512A. The I/O policy manager also directs the I/O scheduler 512A to begin transmitting I/O requests to the I/O device 508A.

The discussion of FIGS. 6-8 above described operations for installing and replacing I/O schedulers. The discussion of FIG. 9 below will describe a method defining how an application program requests an operating system to install a particular I/O scheduler. FIG. 10 will describe how a control program selects an I/O scheduler. According to some embodiments, either application programs or control programs request the operating system to install a particular scheduler. However, according to other embodiments, both application programs and control programs can make such requests.

Figure 9:
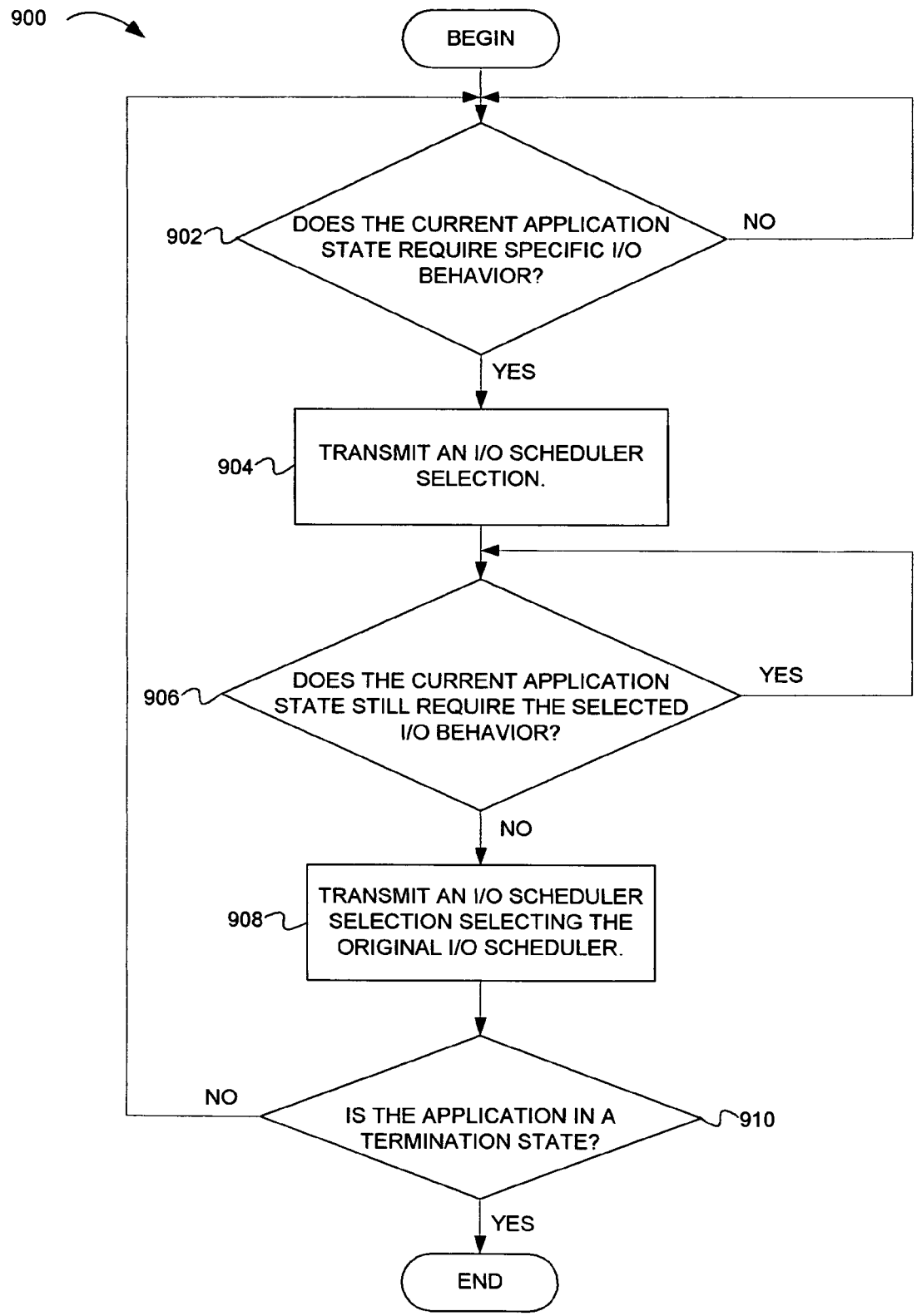
FIG. 9 is a flow diagram illustrating operations for an application program selecting an I/O scheduler, according to example embodiments of the invention.
Figure 10:
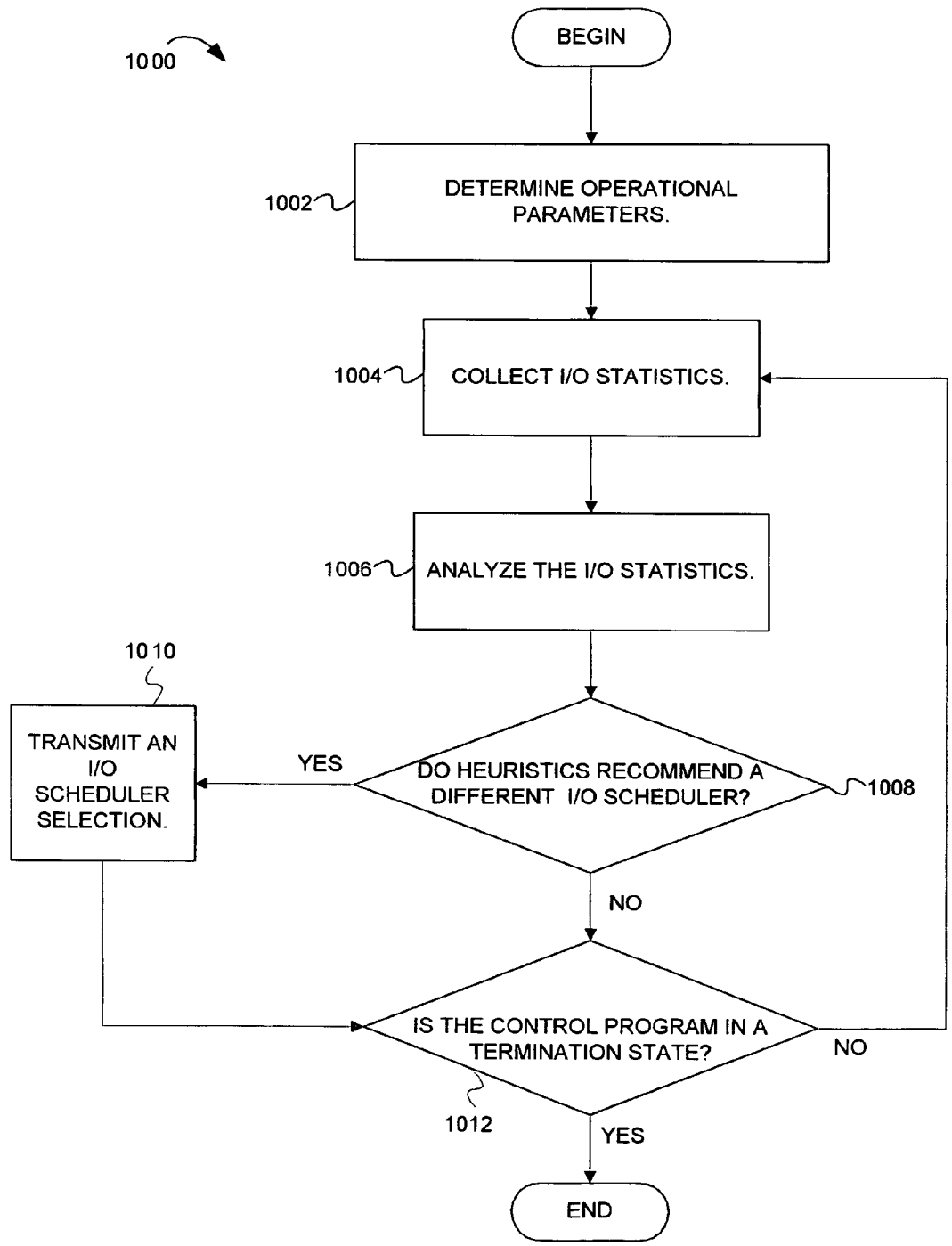
FIG. 10 is a flow diagram illustrating operations for collecting and analyzing I/O statistics and selecting an I/O scheduler based on the I/O statistics, according to example embodiments of the invention.

FIG. 9 is a flow diagram illustrating operations for an application program selecting an I/O scheduler, according to example embodiments of the invention. At block 902, the application program 506 determines whether it requires specific I/O behavior (e.g., real-time disk-scheduling).

At block 904, the application program 506 transmits an I/O scheduler selection to the I/O scheduling policy manager 532.

At block 906, the application program 506 determines whether the selected I/O behavior is still required.

At block 910, the application program 506 determines whether it is in a termination state (i.e., a state from which application program operations cease). If the application program is in a termination state, the flow ends. Otherwise, the flow continues at block 902.

FIG. 10 is a flow diagram illustrating operations for collecting and analyzing I/O statistics and selecting an I/O scheduler based on the I/O statistics, according to example embodiments of the invention.

At block 1002, the control program 504 determines which of the I/O schedulers 212A-C are installed and what scheduling methods the installed schedulers include. The control program 504 also determines for which I/O device each I/O scheduler is scheduling I/O requests. The control program 504 can also determine any other necessary operational parameters.

At block 1004, the control program 504 collects various I/O statistics, such as statistics about the throughput and turnaround time of the I/O requests being scheduled for service by the I/O devices. The control program 504 also collects statistics about the flow of the I/O requests from various I/O request sources.

At block 1006, the control program 504 analyzes the I/O statistics. The control program 504 performs a statistical analysis to determine whether different I/O schedulers could improve I/O scheduling performance. In one embodiment, the I/O scheduling needs of various I/O sources (e.g., the application program 506) define I/O performance. Thus, I/O performance can be improved when different I/O schedulers can better meet the I/O needs of various I/O request sources. The control program 504 can use heuristics to determine whether I/O scheduling performance could be improved.

As shown in block 1008, the control program 504 determines whether its I/O performance heuristics recommend changing I/O schedulers. The heuristics analyze the I/O statistics to determine whether a scheduler should be changed. If the heuristics recommend that an I/O scheduler should be changed, the process continues at block 1010. Otherwise, the flow continues at block 1012.

At block 1010, the control program 504 transmits an I/O scheduler selection to the I/O scheduling policy manager 532.

At block 1012, the control program 504 determines whether it is in a termination state. If the control program is in a termination state, the flow ends. Otherwise, the flow continues at block 1004.

Hardware and Operating Environment

This section provides an overview of the example hardware and the operating environment in which embodiments of the invention can be practiced.

Figure 11:
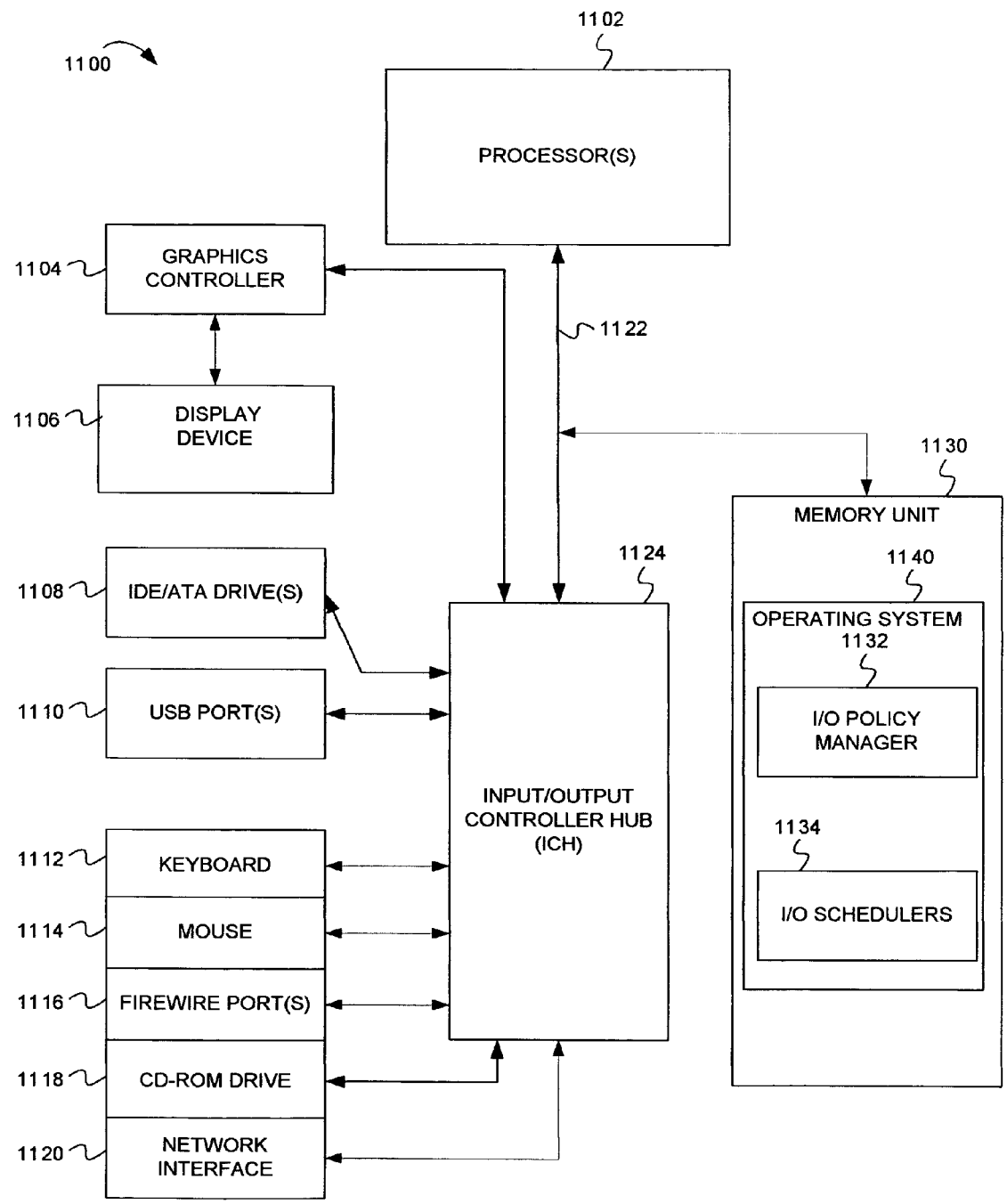
FIG. 11 illustrates an example computer system used in conjunction with certain embodiments of the invention.

FIG. 11 illustrates an example computer system used in conjunction with certain embodiments of the invention. As illustrated in FIG. 11, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. For one embodiment of the invention, the ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system, method, and machine readable medium including instructions for Input/Output scheduling have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

I claim:

1. A method comprising:
    installing a plurality of Input/Output (I/O) schedulers to schedule I/O requests for a plurality of I/O devices, wherein the I/O schedulers are installed in an operating system;
    scheduling at least one of the I/O requests with a selected I/O scheduler of the plurality of I/O schedulers, and transmitting I/O requests to the selected scheduler;
    determining that a replacement I/O scheduler will replace selected I/O scheduler;
    terminating transmitting of I/O requests to the selected scheduler;
    retrieving all I/O requests from at least one queue of the selected I/O scheduler;
    storing the retrieved I/O requests in a temporary queue;
    replacing the selected I/O scheduler with the replacement I/O scheduler, wherein the replacing occurs during execution of the operating system;
    retrieving I/O requests from the temporary queue; and
    scheduling one of the retrieved I/O requests with the replacement scheduler.

2. The method of claim 1, wherein each of the I/O schedulers schedules I/O requests according to a different scheduling method.

3. The method of claim 1, wherein the determining is performed in response to at least one of an application program request for the replacement scheduler and a control program request for the replacement scheduler.

4. The method of claim 1, wherein one of the I/O schedulers of the first set schedules I/O requests according to at least one of the first-in first-out scheduling method, the round robin scheduling method, and the real-time scheduling method.

5. A method comprising:
    receiving an Input/Output (I/O) scheduler selection from an application program, wherein the I/O scheduler selection indicates a replacement I/O scheduler for selecting by an operating system from a set of uninstalled I/O schedulers, wherein the replacement I/O scheduler will schedule I/O requests for service by one of a plurality of I/O devices;
    selecting an installed I/O scheduler from a set of installed I/O schedulers;
    retrieving all I/O requests from the queue of the installed I/O scheduler, and temporarily storing the retrieved I/O requests;
    terminating the installed I/O scheduler;
    implementing a replacement I/O scheduler in place of the terminated I/O scheduler;
    transmitting the stored I/O requests to the replacement I/O scheduler; and
    executing the I/O requests by at least one of the plurality of I/O devices.

6. The method of claim 5, wherein the replacement I/O scheduler includes a disk-scheduling method.

7. The method of claim 5, wherein the application program is a Web browser.

8. A machine-readable storage medium that provides instructions, which when executed by a machine, cause the machine to perform operations comprising:
    installing a plurality of Input/Output (I/O) schedulers to schedule I/O requests for a plurality of I/O devices, wherein the I/O schedulers are installed in an operating system;
    scheduling at least one of the I/O requests with a selected I/O scheduler of the plurality of I/O schedulers, and transmitting I/O requests to the selected scheduler;
    determining that a second I/O scheduler will replace the selected I/O scheduler;
    terminating transmitting of I/O requests to the selected scheduler;
    retrieving all I/O requests from at least one queue of the selected I/O scheduler;
    storing the retrieved I/O requests in a temporary queue;
    replacing the selected I/O scheduler with the second I/O scheduler, wherein the replacing occurs during execution of the operating system;
    retrieving I/O requests from the temporary queue; and
    scheduling one of the retrieved I/O requests with the replacement scheduler.

9. The machine-readable storage medium of claim 8, wherein each of the I/O schedulers schedule I/O requests according to a different scheduling method.

10. The machine-readable storage medium of claim 8, wherein the determining is performed in response to at least one of an application program request for the replacement scheduler and a control program request for the replacement scheduler.

11. The machine-readable storage medium of claim 8, wherein one of the I/O schedulers of the first set schedules I/O requests according to at least one of the first-in first-out scheduling method and a real real-time scheduling method.

12. A machine-readable storage medium that provides instructions, which when executed by a machine, cause the machine to perform operations comprising:
    receiving an Input/Output (I/O) scheduler selection from an application program, wherein the I/O scheduler selection indicates a replacement I/O scheduler for selecting by an operating system from a set of uninstalled I/O schedulers, wherein the replacement I/O scheduler will schedule I/O requests for service by one of a plurality of I/O devices;

selecting an installed I/O scheduler from a set of installed I/O schedulers;
retrieving all I/O requests from the queue of the installed I/O scheduler, and temporarily storing the retrieved I/O requests;
terminating the installed I/O scheduler;
implementing a replacement I/O scheduler in place of the terminated I/O scheduler;
transmitting the stored I/O requests to the replacement I/O scheduler; and
executing the I/O requests by at least one of the plurality of I/O devices.

13. The machine-readable storage medium of claim 12, wherein the first I/O scheduler includes a disk-scheduling method.

14. The machine-readable storage medium of claim 12, wherein the application program is a Web browser.

15. The apparatus of claim 12, wherein each I/O scheduler of the second set utilizes a different scheduling method.

16. The apparatus of claim 12, wherein the plurality of I/O devices are selected from a set consisting essentially of at least two of a disk drive, a CD-ROM drive, a random access memory device, a display, a universal serial bus device, and an IEEE 1394 compliant device.

17. The apparatus of claim 12, wherein the I/O request source includes one of an application program and control program.

18. The apparatus of claim 12, wherein one of the plurality of I/O schedulers utilizes real-time scheduling methods.

19. A computing system comprising:
one or more processors;
at least one I/O device;
a I/O manager operable to manage a plurality of I/O schedulers that schedule requests communicated between the one or more processors and the I/O device, the I/O manager operable to dynamically replace a first I/O scheduler with a second I/O scheduler to handle one or more requests from a request source for servicing by the at least one I/O device, wherein the first and the second I/O schedulers employ different scheduling techniques;
a machine-readable storage medium that provides instructions, which when executed by a machine, cause the machine to perform operations comprising:
receiving an Input/Output (I/O) scheduler selection from an application program, wherein the I/O scheduler selection indicates a replacement I/O scheduler for selecting by an operating system from a set of uninstalled I/O schedulers, wherein the replacement I/O scheduler will schedule I/O requests for service by one of a plurality of I/O devices;
selecting an installed I/O scheduler from a set of installed I/O schedulers;
retrieving all I/O requests from the queue of the installed I/O scheduler, and temporarily storing the retrieved I/O requests;
terminating the installed I/O scheduler;
implementing a replacement I/O scheduler in place of the terminated I/O scheduler;
transmitting the stored I/O requests to the replacement I/O scheduler; and
executing the I/O requests by the I/O device.

20. The computing system of claim 19, wherein the I/O manager is operable to dynamically replace comprises the manager operable to replace an I/O scheduler while avoiding rebooting the apparatus.

21. The computing system of claim 19, wherein the I/O device is selected from a set consisting essentially of a peripheral I/O device and an integrated I/O device.

22. The computing system of claim 19 further comprising one or more interfaces coupled with the one or more processors, wherein the one or more interfaces are selected from a set consisting essentially of a universal serial bus interface, a serial bus interface, a peripheral component interface, and a digital interface substantially compliant with the IEEE 1394 standard.

* * * * *